(12) United States Patent
Bianchi et al.

(10) Patent No.: US 12,307,908 B2
(45) Date of Patent: May 20, 2025

(54) DRONE DEPLOYMENT FOR DISTRIBUTED ASSET MAINTENANCE AND REPAIR

(71) Applicant: International Business Machines Corporation, Armonk, NY (US)

(72) Inventors: Thiago Bianchi, São Carlos (BR); Tiago Bertoni Scarton, São Paulo (BR); Raghu Kiran Ganti, White Plains, NY (US); Mudhakar Srivatsa, White Plains, NY (US)

(73) Assignee: INTERNATIONAL BUSINESS CORPORATION, Armonk, NY (US)

( * ) Notice: Subject to any disclaimer, the term of this patent is extended or adjusted under 35 U.S.C. 154(b) by 681 days.

(21) Appl. No.: 17/667,389

(22) Filed: Feb. 8, 2022

(65) Prior Publication Data
US 2023/0252902 A1    Aug. 10, 2023

(51) Int. Cl.
*G08G 5/32* (2025.01)
*G06N 3/084* (2023.01)
(Continued)

(52) U.S. Cl.
CPC ............ *G08G 5/32* (2025.01); *G06N 3/084* (2013.01); *G06Q 10/20* (2013.01); *G06Q 30/04* (2013.01); *G08G 5/34* (2025.01); *G08G 5/55* (2025.01); *G08G 5/57* (2025.01); *G08G 5/723* (2025.01); *G08G 5/76* (2025.01)

(58) Field of Classification Search
None
See application file for complete search history.

(56) References Cited

U.S. PATENT DOCUMENTS 5,893,081 A    4/1999  Poppen
5,978,730 A   11/1999  Poppen et al.
(Continued)

OTHER PUBLICATIONS

Baiocchi, V., et al., "UAV Application in Post-Seismic Environment", International Archives of the Photogrammetry, Remote Sensing and Spatial Information Sciences, vol. XL-1/W2, 2013, 6 pp.
(Continued)

*Primary Examiner* — Anshul Sood
*Assistant Examiner* — Wenyuan Yang
(74) *Attorney, Agent, or Firm* — KONRAD, RAYNES, DAVDA & VICTOR LLP; Janaki K. Davda

(57) ABSTRACT

Provided are a computer-implemented method, a computer program product, and a computer system for drone deployment for distributed asset maintenance and repair. Embodiments identify a fix for a problem at an asset and identify a drone to perform the fix. Embodiments generate an initial flight plan that describes a drone flight path for the drone, and embodiments generate an updated flight plan for the drone by updating the drone flight path using real-time air traffic data, real-time road traffic data, and real-time drone flight path conditions obtained from one or more edge devices. Embodiments generate an overall flight plan for the drone and one or more other drones using a predicted cost and a predicted period of time for the updated drone flight path. Embodiments send a drone flight path from the overall flight plan to the drone with instructions to fix the problem.

18 Claims, 11 Drawing Sheets

(51) Int. Cl.
*G06Q 10/20* (2023.01)
*G06Q 30/04* (2012.01)
*G08G 5/34* (2025.01)
*G08G 5/55* (2025.01)
*G08G 5/57* (2025.01)
*G08G 5/72* (2025.01)
*G08G 5/76* (2025.01)

(56) References Cited

U.S. PATENT DOCUMENTS

| | | | |
|---|---|---|---|
| 6,021,406 | A | 2/2000 | Kuznetsov |
| 6,038,509 | A | 3/2000 | Poppen et al. |
| 6,826,472 | B1 | 11/2004 | Kamei et al. |
| 9,881,416 | B2 | 1/2018 | Priest |
| 9,947,135 | B2 | 4/2018 | Priest |
| 10,055,831 | B2 | 8/2018 | Loveland et al. |
| 10,089,888 | B2 | 10/2018 | Priest |
| 10,137,984 | B1 | 11/2018 | Flick |
| 10,192,354 | B2 | 1/2019 | Terry et al. |
| 10,198,953 | B2 | 2/2019 | Priest |
| 10,217,207 | B2 | 2/2019 | Marra et al. |
| 10,475,239 | B1 | 11/2019 | Priest |
| 10,497,112 | B2 | 12/2019 | Hummer et al. |
| 10,509,417 | B2 | 12/2019 | van Cruyningen |
| 10,726,729 | B1 * | 7/2020 | Eaves ................. G08G 5/0013 |
| 2016/0003620 | A1 * | 1/2016 | Kapoor ................ G08G 5/0021 701/400 |
| 2016/0180126 | A1 | 6/2016 | Saleem |
| 2016/0307447 | A1 | 10/2016 | Johnson et al. |
| 2017/0134963 | A1 | 5/2017 | Priest |
| 2017/0295609 | A1 * | 10/2017 | Darrow ................. G05D 1/104 |
| 2017/0318477 | A1 | 11/2017 | Priest |
| 2017/0336806 | A1 | 11/2017 | Blanc-Paques et al. |
| 2018/0034036 | A1 | 2/2018 | Perry et al. |
| 2018/0047294 | A1 * | 2/2018 | Esposito ............. G08G 5/0008 |
| 2018/0158006 | A1 * | 6/2018 | Adams ................. G06Q 10/063 |
| 2018/0315306 | A1 * | 11/2018 | Kelly ................... G08G 1/0133 |
| 2018/0342167 | A1 * | 11/2018 | Luo ...................... G08G 5/0043 |
| 2018/0350245 | A1 | 12/2018 | Priest |
| 2019/0043368 | A1 | 2/2019 | Priest |
| 2019/0049275 | A1 * | 2/2019 | Pogorelik ............ G05D 1/0202 |
| 2019/0114564 | A1 * | 4/2019 | Ferguson ......... G06Q 10/06315 |
| 2020/0043229 | A1 | 2/2020 | Jin et al. |
| 2020/0288330 | A1 | 9/2020 | Priest et al. |
| 2020/0394926 | A1 | 12/2020 | Naini et al. |
| 2021/0237381 | A1 * | 8/2021 | Hafenrichter .......... B29C 73/12 |
| 2022/0083987 | A1 * | 3/2022 | Bhunia ................. G05D 1/101 |

OTHER PUBLICATIONS

Hu, Z., et al., "BIM-Based Integrated Delivery Technologies for Intelligent MEP Management in the Operation and Maintenance Phase", Advances in Engineering Software, 115, 2018, 16 pp.

Mell et al., "Effectively and Securely Using the Cloud Computing Paradigm" dated Oct. 7, 2009, NIST, Information Technology Laboratory, 80 pp.

Mell et al., "The NIST Definition of Cloud Computing" dated Sep. 2011, Recommendations of the National Institute of Standards and Technology, 7 pp.

* cited by examiner

DRONE DEPLOYMENT FOR DISTRIBUTED ASSET MAINTENANCE AND REPAIR

BACKGROUND

Embodiments of the invention relate to drone deployment for distributed asset maintenance and repair.

Asset management today is manual in the field, relying on experts to go to the asset to perform maintenance or make repairs (e.g., to fix any software or hardware that is broken). Monitoring existing assets requires instrumentation (e.g., a camera to look at the asset and a person to monitor the camera images) dedicated to the assets, which may be expensive.

With the advent of drone technology, drones are being used in asset management to monitor existing assets and to provide continuous feedback to asset management teams. Then, the asset management teams perform the maintenance and repair.

SUMMARY

In accordance with certain embodiments, a computer-implemented method is provided for drone deployment for distributed asset maintenance and repair. The computer-implemented method comprises operations that identify a fix for a problem at an asset of a plurality of assets. The operations identify a drone of a plurality of drones to perform the fix. The operations generate an initial flight plan that describes a drone flight path for the drone from a current location to a location of the asset. The operations obtain, from one or more edge devices, real-time data that includes real-time air traffic data, real-time road traffic data, and real-time drone flight path conditions. The operations generate an updated flight plan for the drone by updating the drone flight path using the real-time air traffic data, the real-time road traffic data, and the real-time drone flight path conditions. The operations predict a cost and a period of time for the updated drone flight path. The operations generate an overall flight plan for the drone and one or more other drones using the predicted cost and the predicted period of time. The operations send a drone flight path from the overall flight plan to the drone with instructions to fix the problem.

In accordance with other embodiments, a computer program product is provided for drone deployment for distributed asset maintenance and repair. The computer program product comprises a computer readable storage medium having program code embodied therewith, the program code executable by at least one processor to perform operations that identify a fix for a problem at an asset of a plurality of assets. The operations identify a drone of a plurality of drones to perform the fix. The operations generate an initial flight plan that describes a drone flight path for the drone from a current location to a location of the asset. The operations obtain, from one or more edge devices, real-time data that includes real-time air traffic data, real-time road traffic data, and real-time drone flight path conditions. The operations generate an updated flight plan for the drone by updating the drone flight path using the real-time air traffic data, the real-time road traffic data, and the real-time drone flight path conditions. The operations predict a cost and a period of time for the updated drone flight path. The operations generate an overall flight plan for the drone and one or more other drones using the predicted cost and the predicted period of time. The operations send a drone flight path from the overall flight plan to the drone with instructions to fix the problem.

In accordance with yet other embodiments, a computer system is provided for drone deployment for distributed asset maintenance and repair. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations that identify a fix for a problem at an asset of a plurality of assets. The operations identify a drone of a plurality of drones to perform the fix. The operations generate an initial flight plan that describes a drone flight path for the drone from a current location to a location of the asset. The operations obtain, from one or more edge devices, real-time data that includes real-time air traffic data, real-time road traffic data, and real-time drone flight path conditions. The operations generate an updated flight plan for the drone by updating the drone flight path using the real-time air traffic data, the real-time road traffic data, and the real-time drone flight path conditions. The operations predict a cost and a period of time for the updated drone flight path. The operations generate an overall flight plan for the drone and one or more other drones using the predicted cost and the predicted period of time. The operations send a drone flight path from the overall flight plan to the drone with instructions to fix the problem.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
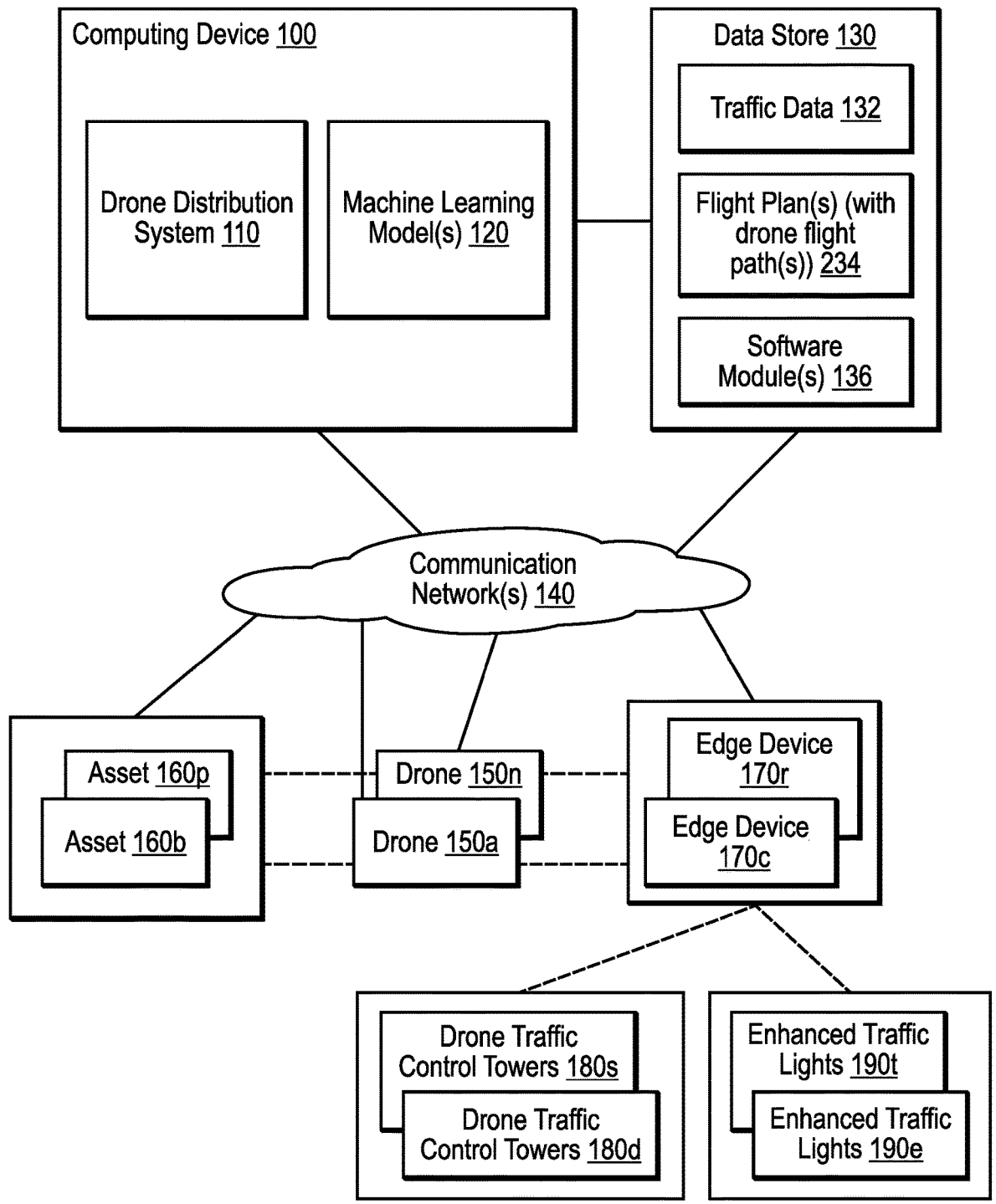
FIG. 1 illustrates, in a block diagram, a computing environment in accordance with certain embodiments.

FIG. 1 illustrates, in a block diagram, a computing environment in accordance with certain embodiments. In the example of FIG. 1, a computing device 100 is connected either directly or via one or more communication networks 140 to a data store 130. In certain embodiments, the computing device 100 and/or the data store 130 are part of a cloud infrastructure.

In the example of FIG. 1, the computing device 100 is also connected via the one or more communication networks 140 to drones 150a . . . 150n, which are able to communicate with assets 160b . . . 160p. In certain embodiments, when a drone 150a . . . 150n is physically close to an asset 160b . . . 160p, they may communicate wirelessly. In other embodiments, the assets 160b . . . 160p are connected to the one or more communication networks 140, and the drones 150a . . . 150n and the assets 160b . . . 160p communicate via the one or more communication networks 140.

The computing device 100 includes a drone distribution system 110 and one or more machine learning models 120. The data store 130 includes traffic data 132, one or more flight plans 134, and software modules 136. Traffic data 132 may be described as air traffic data (which includes data about the movements and positions of other drones and air-borne vehicles (e.g., airplanes, helicopters, etc.)), road traffic data (which includes data about the movements and positions of road vehicles (e.g., cars, bicycles, trucks, buses, etc.), and flight path conditions. Each of the flight plans 134 may include one or more drone flight paths (e.g., which may start at different times on the same or different days) and additional information. The drone distribution system 110 may assign each of the one or more drone flight paths to a drone. Also, the drone distribution system 110 may identify the additional information of, for each drone flight path, an identifier of the drone, and identifier of the asset, weather conditions on the flight path, etc. In certain embodiments, the drone flight paths are pre-determined routes that follow road networks and are pre-determined by, for example, a government entity that determines authorized (allowed) routes for drones. The flight plans may be initial flight plans of one or more drones, updated flight plans of the one or more drones or overall flight plans of multiple drones.

A drone flight path may indicate a starting point (e.g., to rise into the air from ground level, from a platform, from the top of a building, etc.), multiple points at which the drone may stop to perform processing (e.g., performing fixes or maintenance checks of assets), and a landing point at which the drone lands (e.g., descending from the air to the ground, to a platform, to the top of a building, etc.). The drone flight paths are generated to avoid known obstacles, and the drones include components to detect and avoid new obstacles in real time. The drone flight paths are three dimensional (e.g., along the x, y, z directions) as the drone may move up and down, side to side, etc.

The software modules 136 may be distributed to the drones 150a . . . 150n, and the drones 150a . . . 150n may distribute the software modules 136 to assets 160b . . . 160p, may use the software modules 136 to replace software modules of the assets 160b . . . 160p, etc.

Each of the drones 150a . . . 150n may be connected to one or more of the edge devices 170c . . . 170r. Each of the edge devices 170c . . . 170r may be connected to one or more of the drone traffic control towers 180d . . . 180s and to one or more of the enhanced traffic lights 190e . . . 190t. In certain embodiments, an edge device 170c . . . 170r is co-located (i.e., is physically close to) one or more drone traffic control towers 180d . . . 180s and is co-located (i.e., is physically close to) to one or more of the enhanced traffic lights 190e . . . 190t. In such embodiments, the edge device 170c . . . 170r retrieves (or receives) air traffic data about other drones and other air-borne vehicles from the drone traffic control towers 180d . . . 180s. Also, in such embodiments, the edge device 170c . . . 170r retrieves (or receives) road traffic data from the enhanced traffic lights 190e . . . 190t. In certain embodiments, the enhanced traffic lights 190e . . . 190t are traffic lights that are enhanced to collect and provide road traffic data to the edge devices 170c . . . 170r. The road traffic data and the air traffic data are provided by the edge devices 170c . . . 170r to the drones 150a . . . 150n (either wirelessly or via the communication network 140), and the drones 150a . . . 150n provide the traffic data to the drone distribution system 110 for storage in the data store 130 as traffic data 132. In certain embodiments, road traffic data and the air traffic data are provided by the edge devices 170c . . . 170r to the computing device 100 (via the communication network 140) drone distribution system 110 for storage in the data store 130 as traffic data 132. The air traffic data from the drone traffic control towers 180d . . . 180s and the and the road traffic data from the enhanced traffic lights 190e . . . 190t may also include drone flight path conditions, such as weather (e.g., wind, rain, temperature, etc.), road work along the drone flight path, construction of buildings along the drone flight path, etc. In addition, the edge devices 170c . . . 170r may identify and provide drone flight path data that includes local conditions, such as weather.

In certain embodiments, drone traffic control towers 180d . . . 180s monitor and collect data on traffic in a certain altitude range (e.g., from the ground to a height that drones 150a . . . 150n are authorized to fly).

In certain embodiments, an asset may be described as any physical object that needs maintenance or repair (e.g., a cellular tower, an evolved Node B (eNodeB) hotspot, etc.). An evolved Node B may be described as hardware that is connected to a mobile phone network that communicates directly and wirelessly with mobile phones. 5G may be used to describe a fifth generation (5G) mobile phone network.

In certain embodiments, the drones 150a . . . 150n (which may also be referred to as Unmanned Aerial Vehicles (UAVs)) may be described as aircraft piloted by onboard computers.

Figure 2:
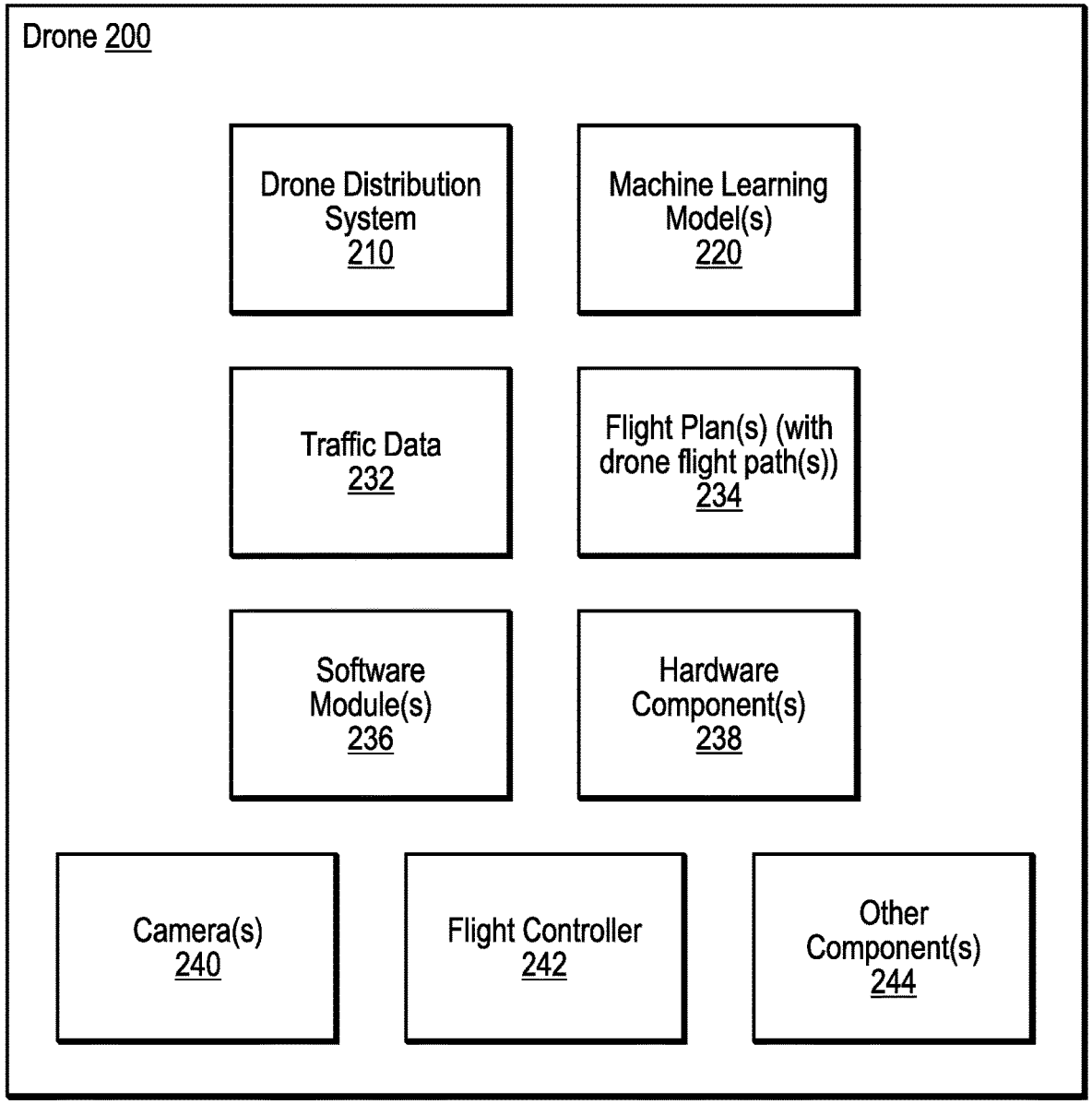
FIG. 2 illustrates, in a block diagram, further details of a drone in accordance with certain embodiments.

FIG. 2 illustrates, in a block diagram, further details of a drone 200 in accordance with certain embodiments. In certain embodiments, each drone 150a . . . 150n includes the components of drone 200. In certain embodiments a drone 200 includes a drone distribution system 210 and one or more machine learning models 220. In certain embodiments, when the drone 200 is not able to connect to the computing device 100 to receive a drone flight path, a drone of a group of drones may be selected to generate an overall flight plan (which may be referred to as a plan of traffic control). In such embodiments, the drone distribution system 210 of the selected drone is able to use traffic data 232 (which may be a copy of traffic data 132 retrieved via the one or more communication networks 140 at an earlier point in time) and generate one or more flight plans 234. The drone distribution system 210 may also identify one or more software modules 236 that may be used to fix or update software modules of the asset and/or may identify one or more hardware components 238 that may be used to fix or update hardware components of the asset. Thus, with embodiments, the drone 200 is able to carry/ferry items (e.g., antennas, software, other assets, etc.) for the actual maintenance and repair of the asset.

In certain embodiments, the drone 200 includes a camera 240, a flight controller 242, and one or more other components 244. For example, the camera 240 may generate an image of an asset, and the drone distribution system 210 compares the generated image with a stored image of the asset (at a point in time that the asset did not need maintenance or repairs) to determine whether hardware (e.g., an antenna) of the asset is broken. With embodiments, the flight controller 242 is able to move the drone along a drone flight path. The one or more other components 244 may include: a speaker, a microphone, electronic speed controllers to control speed and direction of the drone, a Global Positioning System (GPS) module, a battery, an antenna, a receiver, one or more sensors (e.g., collision avoidance sensors), an accelerometer (for measuring speed), an altimeter (for measuring altitude), etc.

Figure 3:
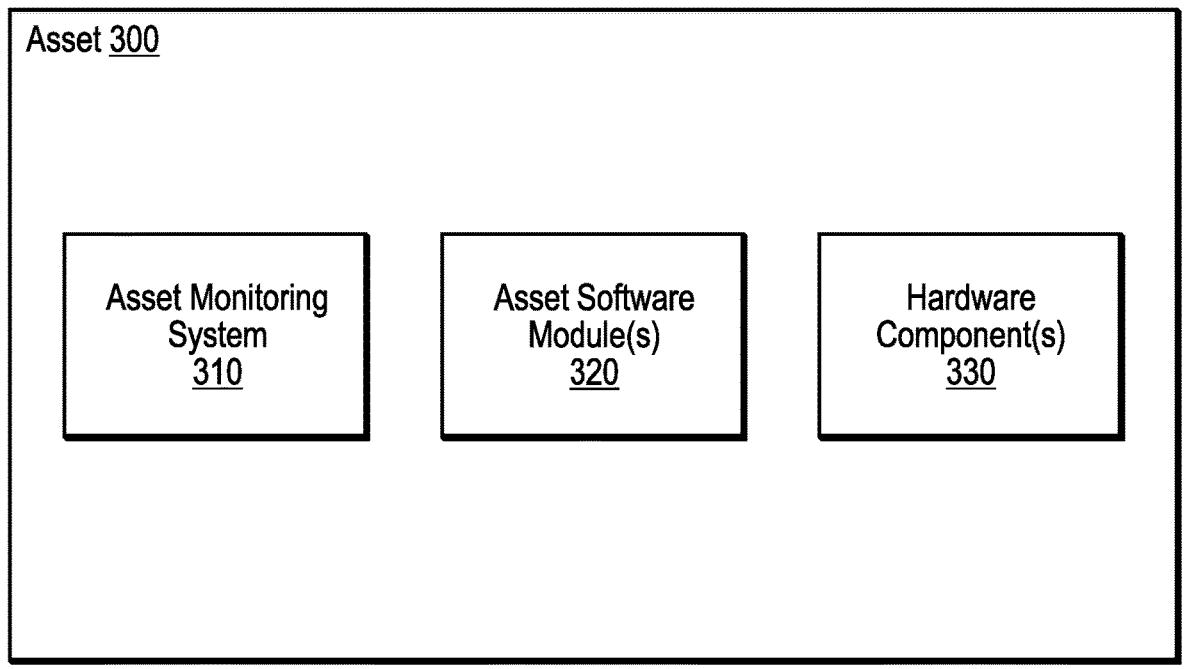
FIG. 3 illustrates, in a block diagram, further details of an asset in accordance with certain embodiments.

FIG. 3 illustrates, in a block diagram, further details of an asset 300 in accordance with certain embodiments. In certain embodiments, each asset 160b . . . 160p includes the components of asset 300. The asset 300 includes an asset monitoring system 310, one or more software modules 320, and one or more hardware components 330. The asset monitoring system 310 may periodically check the health of the asset and send an event to the computing device 100 identifying a problem at the asset. In certain embodiments, the event indicates a problem with one or more software modules 320, and a drone 150a . . . 150n is routed to the asset to update the one or more software modules 320. The drone 150a . . . 150n may update or replace the one or more software modules 320 of the asset 300. In certain embodiments, the event indicates a problem with one or more hardware components 330, and a drone 150a . . . 150n is routed to the asset to update the one or more hardware components 330. The drone 150a . . . 150n may update or replace the one or more hardware components 330 of the asset 300. In certain embodiments, the drone includes a robotic arm or other means to perform fixes of the hardware components 330, such as tightening a screw or replacing an antenna. The drone distribution system 210 performs the operations for update or repair of the software modules 320 and the hardware components 330.

With the recent increase in drone traffic, the drone distribution system 110, 210 improves drone traffic. Unlike conventional systems that focus on drone traffic management with reference to the time taken for delivery or going from one point to another, the drone distribution system 110, 210 improves drone traffic management for asset management. For an asset, the drone distribution system 110, 210 uses one or more drones 150a . . . 150n to identify an issue (e.g., a maintenance issue or a problem to be fixed) with the asset, to determine an amount of time ("a first amount of time") to fix the problem, and, if needed, to determine an amount of time ("a second amount of time") for resources (e.g., software modules, hardware components, an asset management team, etc.) to get to the location of the asset to fix the problem. The first amount of time and the second amount of time may be the same amount of time or may be different amounts of time. In certain embodiments, the drone performs the fix (e.g., updating software of the asset using one or more software modules 136, tightening a screw, replacing an antenna, etc.). In other embodiments, the drone works with an asset management team to perform the fix (e.g., the drone guides the asset management team to the location of the asset and highlights (e.g., with a light) the area of the asset to be repaired (e.g., an antenna).

With embodiments, the drone distribution system 110, 210 provides drone traffic management that is aware of work orders (which may be referred to as asset ticket orders) and captures real-time requirements to enable intelligent routing of multiple drones between many points (e.g., a drone may move from a first point to a second point to a third point, performing different or the same tasks at each point). This routing of the multiple drones may be for monitoring assets, performing upgrades or repairs of assets, transporting assets or other reasons.

In certain embodiments, the drone distribution system 110, 210 performs drone traffic control in a hierarchical and distributed fashion, with drone traffic control towers being co-located with edge devices (e.g., 5G-enabled edge computers/devices that are able communicate using a 5G mobile phone network) and co-located with enhanced traffic lights. Co-located may be described as being physically close by. The drone distribution system 110, 210 may collect and store traffic data 132 from multiple sources, such as from: the control towers departments of transportation (of different cities, different regions, etc.), companies (e.g., utility companies or other companies managing the assets), and other third-party entities.

In certain embodiments, traffic control is a staged planning. In the first stage, the drone distribution system 110, 210 identifies an initial flight plan for a drone (i.e., admission control). The initial flight plan may be based on coarse granular congestion information (of entities in the air, such as airplanes and drones) and work order status of the asset. The initial flight plan, for example, may indicates which regions a drone is allowed to enter or not enter at certain dates and times, and, based on this, a drone may hover in one region for a period of time before entering another region (e.g., due to other air-borne traffic). In certain embodiments, a work order for an asset identifies the asset and work to be performed on the asset (e.g., maintenance or problem resolution). In the second stage, the drone distribution system 110, 210 performs route planning based on real-time air traffic and real-time road traffic conditions. The real-time road traffic conditions may be for a particular road network (i.e., set of routes that the drone may fly over). In certain embodiments, the road network may be authorized by or assigned by a government entity for use by drones. In certain embodiments, the drones have pre-defined drone flight paths (which may follow road networks).

The drone distribution system 110, 210 specializes a work order plan, which indicates what a group of drones are to do to fix multiple problems of multiple assets, while considering the specificities of a local edge device to plan the drone route. In certain embodiments, the drone distribution system 110, 210 receives the work order from an enterprise asset management system. In certain embodiments, the traffic data 132 includes: temperature, traffic, weather, nearby crews, material availability, and crew workloads. The drone distribution system 110, 210 outputs a work order execution calendar for dispatching drones to execute the work orders.

In certain embodiments, the drone distribution system 110, 210 uses machine learning models 120 to predict cost and a period of time based on the vicinity conditions and bias the overall flight plan considering the local mobile phone network in the neighborhood. With embodiments, after the work order is executed, the drone distribution system 110, 210 updates the machine learning models 120 based on feedback.

Figure 4A:
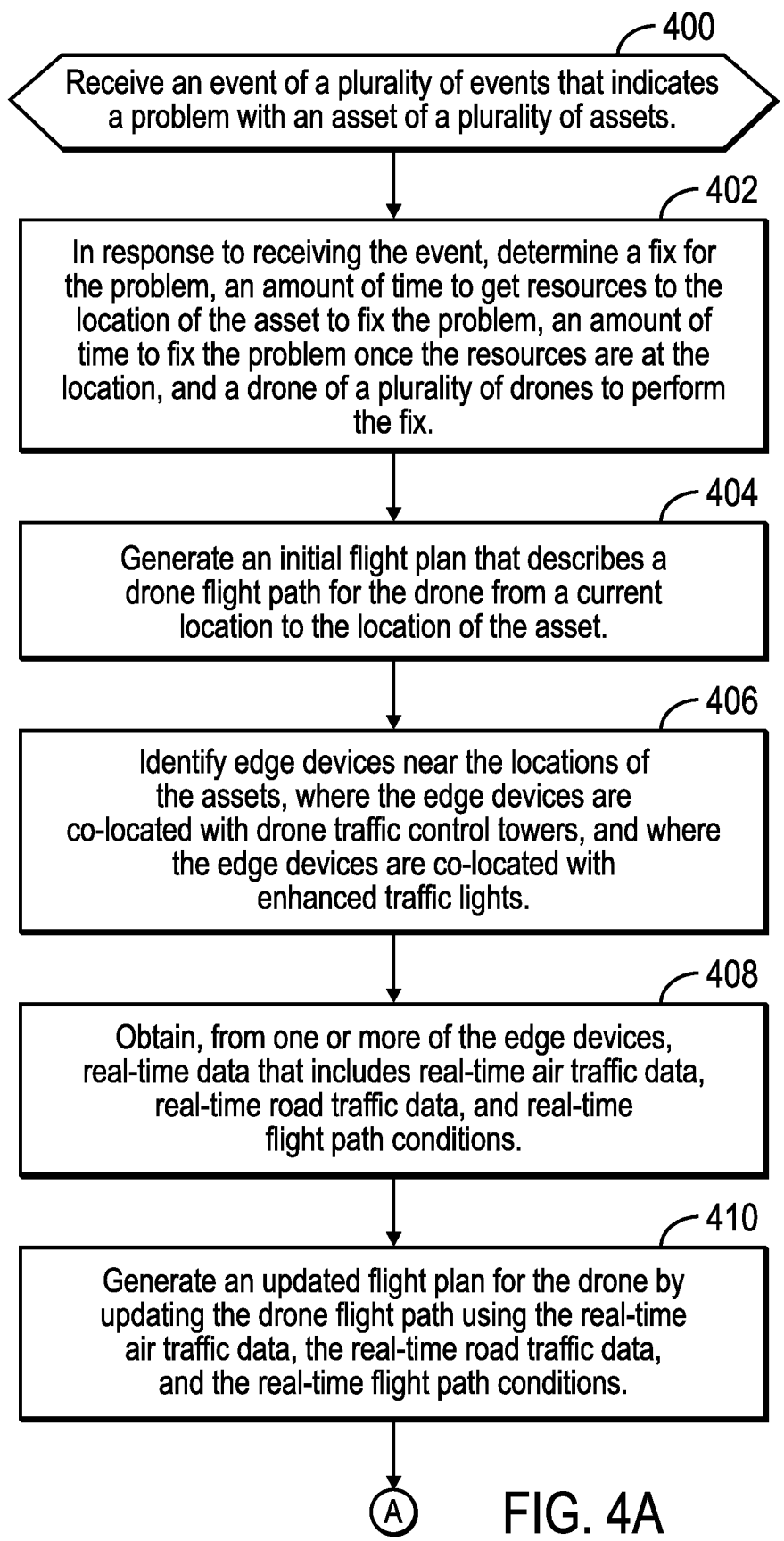
FIGS. 4A and 4B illustrate, in a flowchart, operations for deploying drones for asset management in accordance with certain embodiments.
Figure 4B:
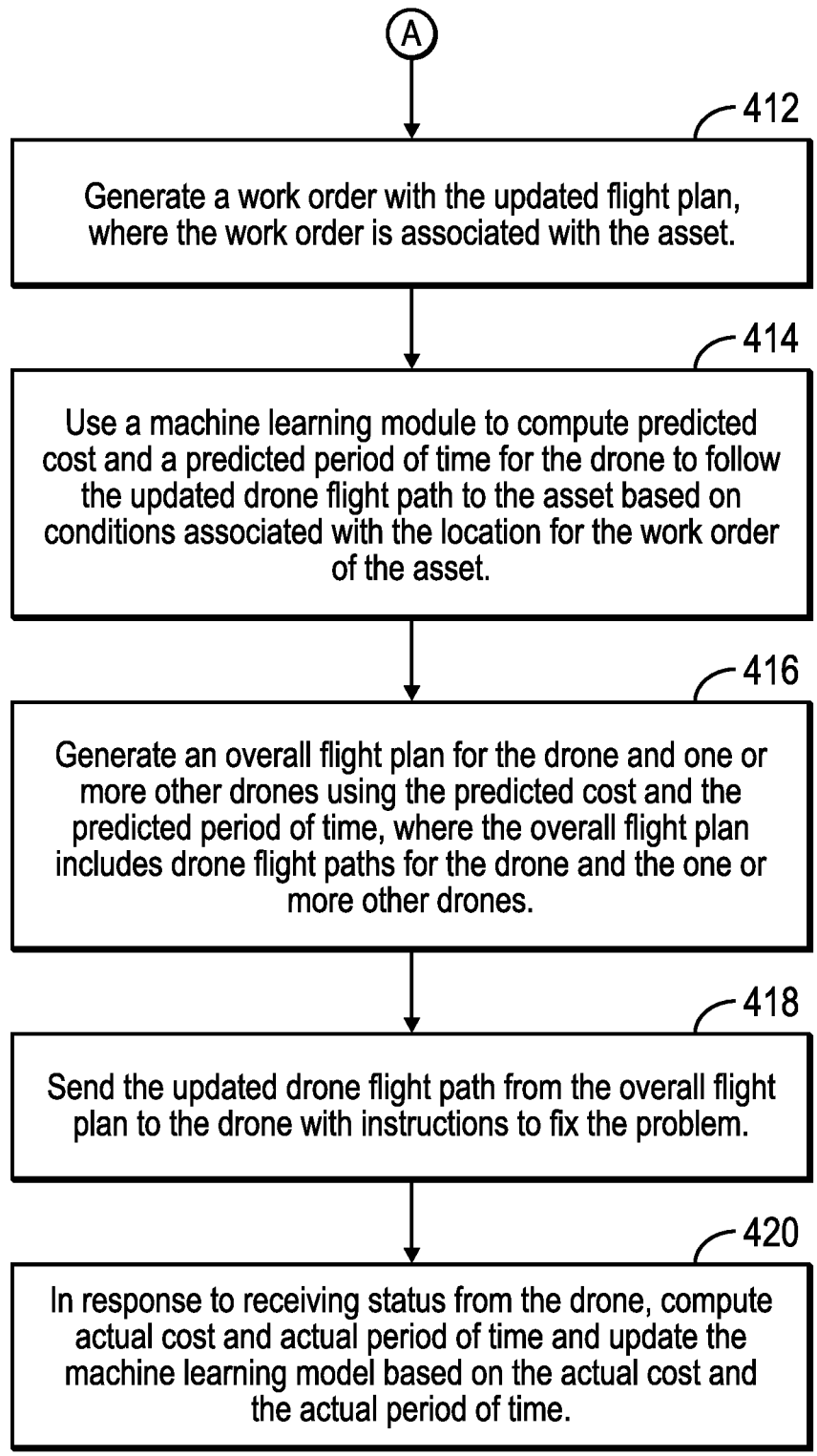

FIGS. 4A and 4B illustrate, in a flowchart, operations for deploying drones for asset management in accordance with certain embodiments. In various embodiments, either the drone distribution system 110, the drone distribution system 210 or the combination of the drone distribution system 110 and the drone distribution system 210 performs the operations of FIGS. 4A and 4B.

Control begins at block 400 with the drone distribution system 110, 210 receiving an event of a plurality of events that indicates a problem with an asset of a plurality of assets. In certain embodiments, the drone distribution system 110, 210 receives the event from an asset monitoring system of an asset. In certain embodiments, the event indicates a general problem (e.g., lights are not turning on at a cell tower at dusk), and the drone distribution system 110, 210 identifies a specific problem (e.g., the software that turns on the lights should be updated).

In block 402, in response to receiving the event, the drone distribution system 110, 210 determines a fix for the problem, an amount of time to get resources to the location of the asset to fix the problem, an amount of time to fix the problem once the resources are at the location, and a drone of a plurality of drones to perform the fix. In certain embodiments the resources maybe one or more software modules and/or one or more hardware components delivered by the drone. In other embodiments, the resources may be an asset management team with hardware (e.g., an antenna).

In block 404, the drone distribution system 110, 210 generates an initial flight plan that describes a drone flight path for the drone from a current location to the location of the asset. With embodiments, the drone distribution system 110, 210 knows the location of the identified drone and the location of the asset, and, based on these locations, generates the drone flight path for the initial flight plan. In certain embodiments, the drone flight path is selected from pre-determined routes that follow road networks and are pre-determined by, for example, a government entity. In certain embodiments, the drone distribution system 110, 210 generates an initial flight plan using coarse granular congestion information associated with the locations of the drone and the asset and the status of a work order associated with the event. In certain embodiments, the course granular congestion information is from a set of entities associated with drone traffic, including a transport department, a utility company managing assets, and third-party entities.

In block 406, the drone distribution system 110, 210 identifies edge devices near the locations of the assets, where the edge devices are co-located with drone traffic control towers, and where the edge devices are co-located with enhanced traffic lights. In certain embodiments, co-located may be described as within a radio range or connected directly via a wired connection. In block 408, the drone distribution system 110, 210, from one or more of the edge devices, identifies real-time data that includes real-time air traffic data, real-time road traffic data, and real-time drone flight path conditions. The edge devices obtain this data from one or more of the drone traffic control towers and from one or more of the enhanced traffic lights.

In block 410, the drone distribution system 110, 210 generates an updated flight plan for the drone by updating the drone flight path using the real-time air traffic data, the real-time road traffic data, and the real-time drone flight path conditions. That is, the edge devices provide the real time information, which may be used to update the flight plan. From block 410 (FIG. 4A), processing continues to block 412 (FIG. 4B). In certain embodiments, the drone distribution system 110, 210 updates the initial flight plan with a route plan using real-time traffic and drone flight path conditions received from drone traffic controller towers by the edge devices proximate the location and using information including local temperature, traffic, weather, available work crew, workload of the available crew and material availability from the edge devices.

In block 412, the drone distribution system 110, 210 generates a work order with the updated flight plan, where the work order may be associated with the asset. In certain embodiments, the work order identifies the asset, the problem, the fix (e.g., repair or update), the drone providing the fix, the updated flight plan, etc. In certain embodiments, the drone distribution system 110, 210 adds the work order to a work order execution calendar, and the work order is executed to dispatch the drone to the asset to perform the fix at the calendared date and time.

In block 414, the drone distribution system 110, 210 uses a machine learning module to compute predicted cost and a predicted period of time for the drone to follow the updated drone flight path to the asset based on conditions associated with the location for the work order of the asset. In certain embodiments, the conditions include current congestion level in the region and weather-related parameters (e.g., head wind, the payload weight that the drone is carrying, etc.). In certain embodiments, cost may be measured based on any combination of: energy expended by the drone, the carbon footprint, the battery drain on the drone, etc.). In certain embodiments, the drone distribution system 110, 210 computes the predicted cost and the predicted period of time for the drone to follow the updated drone flight path and perform the fix.

In certain embodiments, the same or another machine learning module may be used to prioritize different problems so that drones are sent first to fix the higher priority problems.

In block 416, the drone distribution system 110, 210 generates an overall flight plan for the drone and one or more other drones using the predicted cost and the predicted period of time, where the overall flight plan includes drone flight paths for the drone and the one or more other drones. With embodiments, the overall flight plan takes into consideration multiple drones, as well as other air traffic (e.g., airplanes, helicopters, cars, etc.) to ensure that there are no collisions of the different entities moving through the air and that there is no duplication of different drones or different groups of drones going to fix the same problem. In certain embodiments, the overall flight plan also takes into consideration priority of the problems. In certain embodiments, the overall flight plan takes into account characteristics of a 5G mobile phone network in the neighborhood of the asset.

In block 418, the drone distribution system 110, 210 sends the updated drone flight path from the overall flight plan to the drone with instructions to fix the problem. In certain embodiments, the updated drone flight path is sent to a group of drones. For example, if the problem requires different software modules, and different drones carry each of these different software modules, then a group of drones may be sent to fix the problem, with each drone updating a software module of the asset. As another example, if the problem requires changing light bulbs, multiple drones in a group may be sent with light bulbs, with each changing one of the light bulbs on the asset. Then, the drone or drone group fixes the problem in accordance with the instructions.

In block 420, the drone distribution system 110, 210, in response to receiving status from the drone, computes the actual cost and the actual period of time and updates the machine learning model based on the actual cost and the actual period of time. This improves the ability of the machine learning model to predict the cost and the period of time subsequently. The status from the drone includes information for computing the actual cost and the actual period of time for the drone to follow the updated drone flight path to the asset. In certain embodiments, the status from the drone includes information for computing the actual cost and the actual period of time for the drone to follow the updated drone flight path to the asset and perform the fix.

Figure 5A:
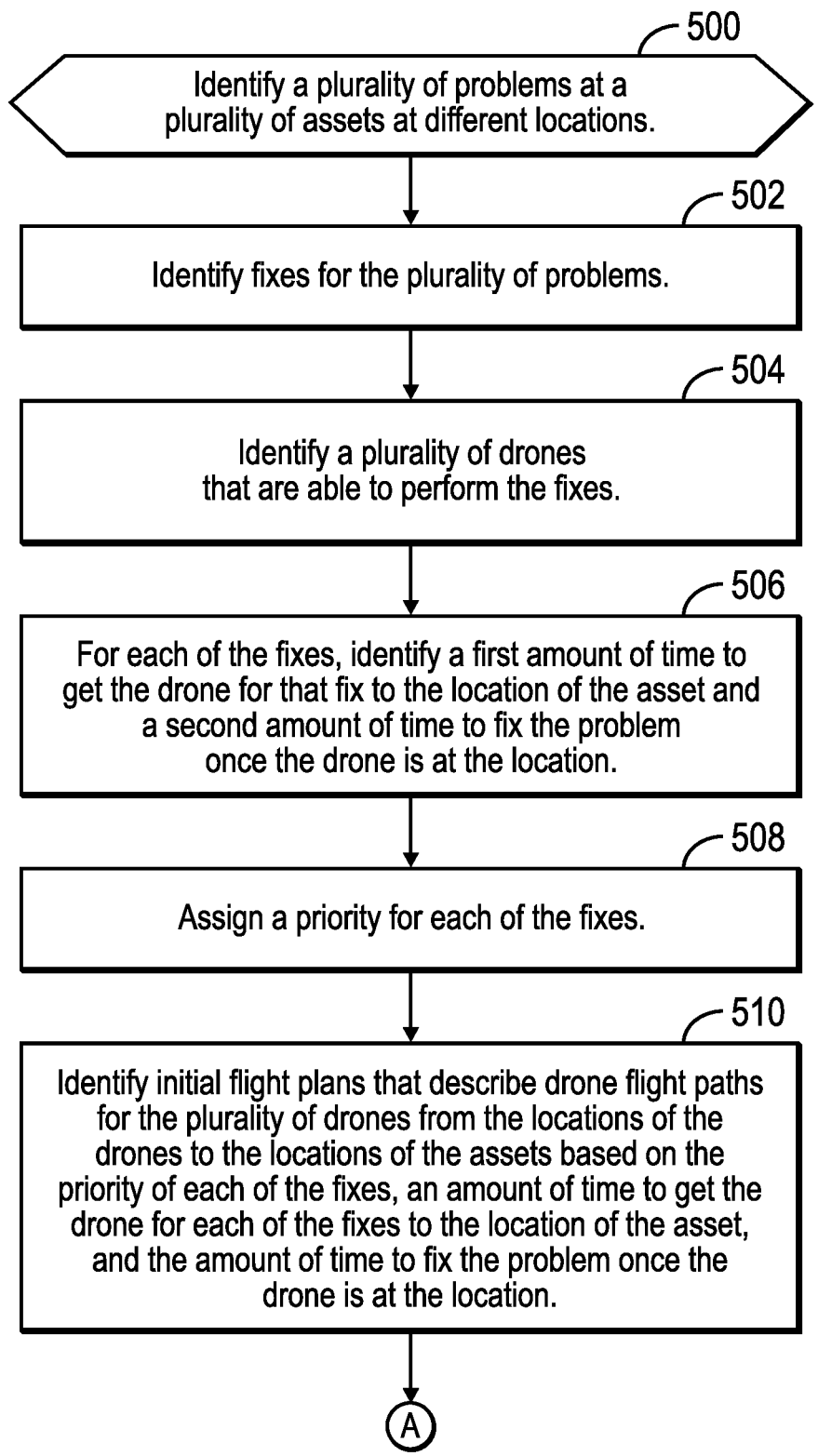
FIGS. 5A and 5B illustrate, in a flowchart, operations for performing fixes using drones in accordance with certain embodiments.
Figure 5B:
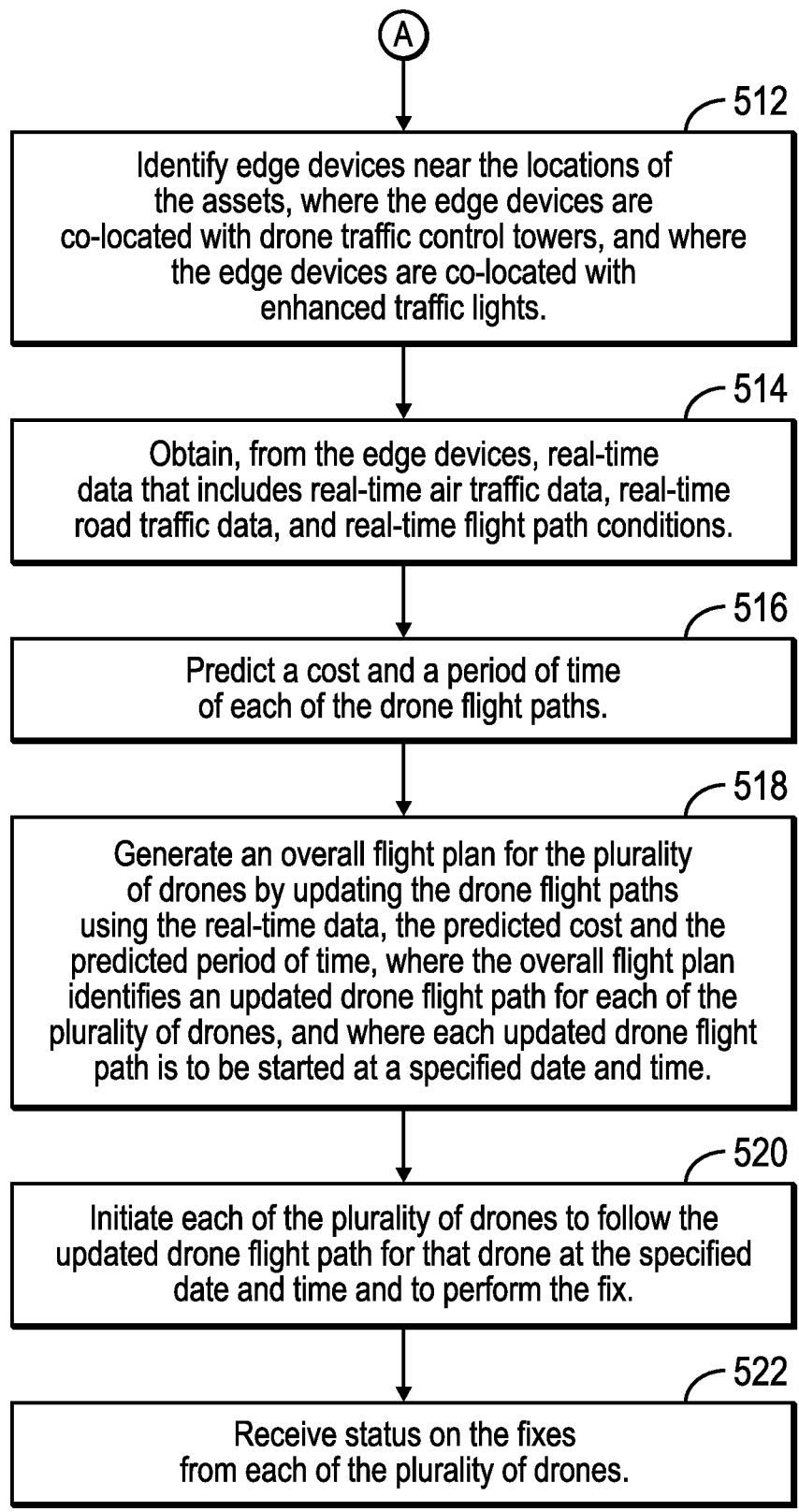

FIGS. 5A and 5B illustrate, in a flowchart, operations for performing fixes using drones in accordance with certain embodiments. In various embodiments, either the drone distribution system 110, the drone distribution system 210 or the combination of the drone distribution system 110 and the drone distribution system 210 performs the operations of FIGS. 5A and 5B.

Control begins at block 500 with the drone distribution system 110, 210 identifying a plurality of problems at a plurality of assets at different locations. In block 502, the drone distribution system 110, 210 identifies fixes for the plurality of problems. In block 504, the drone distribution system 110, 210 identifies a plurality of drones that are able to perform the fixes. In certain embodiments, each of the drones is able to fix one or more problems at one or more assets. For example, one drone may be able to fix multiple problems at one asset and another problem at another asset.

In block 506, the drone distribution system 110, 210, for each of the fixes, identifies a first amount of time to get the drone for that fix to the location of the asset and a second amount of time to fix the problem once the drone is at the location. The first amount of time and the second amount of time may be the same amount of time or may be different amounts of time.

In block 508, the drone distribution system 110, 210 assigns a priority for each of the fixes. In block 510, the drone distribution system 110, 210 identifies initial flight plans that describe drone flight paths for the plurality of drones from the locations of the drones to the locations of the assets based on the priority of each of the fixes, an amount of time to get the drone for each of the fixes to the location of the asset, and the amount of time to fix the problem once the drone is at the location. From block 510 (FIG. 5A), processing continues to block 512 (FIG. 5B).

In block 512, the drone distribution system 110, 210 identifies edge devices near the locations of the assets, where the edge devices are co-located with drone traffic control towers, and where the edge devices are co-located with enhanced traffic lights. In block 514, the drone distribution system 110, 210 obtains, from the edge devices, real-time data that includes real-time air traffic data, real-time road traffic data, and real-time drone flight path conditions.

In block 516, the drone distribution system 110, 210 predicts a cost and a period of time of each of the drone flight paths. In block 518, the drone distribution system 110, 210 generates an overall flight plan for the plurality of drones by updating the drone flight paths using the real-time data, the predicted cost, and the predicted period of time, where the overall flight plan identifies an updated drone flight path for each of the plurality of drones, and where each updated drone flight path is to be started at a specified date and time.

In block 520, the drone distribution system 110, 210 initiates each of the plurality of drones to follow the updated drone flight path for that drone at the specified date and time and to perform the fix.

In block 522, the drone distribution system 110, 210 receives status on the fixes from each of the plurality of drones. The status from each of the drones may indicate that the fix was successful or that the fix was not successful, with an indication of why the fix was not successful. Based on the status, the drone distribution system 110, 210 may take further action, such as sending a different drone to attempt the fix or generating a report.

With embodiments, the use of drones improves the process of fixing assets that are broken or need attention.

In certain embodiments, the drone distribution system 110, 210 provides drone traffic management. In response to receiving information associated with an event that includes identification of a problem, an estimation of time to fix the problem, and a time for resources to get to a location associated with the problem, the drone distribution system 110, 210 identifies drone traffic control towers proximate to the location and being co-located with edge devices co-located with a set of traffic lights. The drone distribution system 110, 210 receives additional information from a set of entities associated with drone traffic, including a transport department, a utility company managing assets, and third-party entities.

The drone distribution system 110, 210 generates an initial flight plan (for traffic control) using coarse granular congestion information associated with the location and status of a work order associated with the event. For example, this coarse granular congestion information may indicate a total number of air-borne vehicles in a region, a number of drones (of the air-borne vehicles) in the region, etc. The drone distribution system 110, 210 may obtain the coarse granular congestion information may from edge devices. The drone distribution system 110, 210 updates the initial flight plan using real-time traffic and drone flight path conditions received from authorized drone traffic control towers by the edge devices proximate the location using information including local temperature, traffic, weather, available work crew, workload of the available crew and material availability.

The drone distribution system 110, 210 generates a work order execution calendar to dispatch and execute the work order. The drone distribution system 110, 210 computes predicted cost and period of time using conditions associated with the location with a machine learning model. The drone distribution system 110, 210 generates an overall flight plan using computed predicted cost and period of time in association with 5G neighborhood characteristics. In response to execution of work order, the drone distribution system 110, 210 updates the pre-determined machine learning model.

Figure 6:
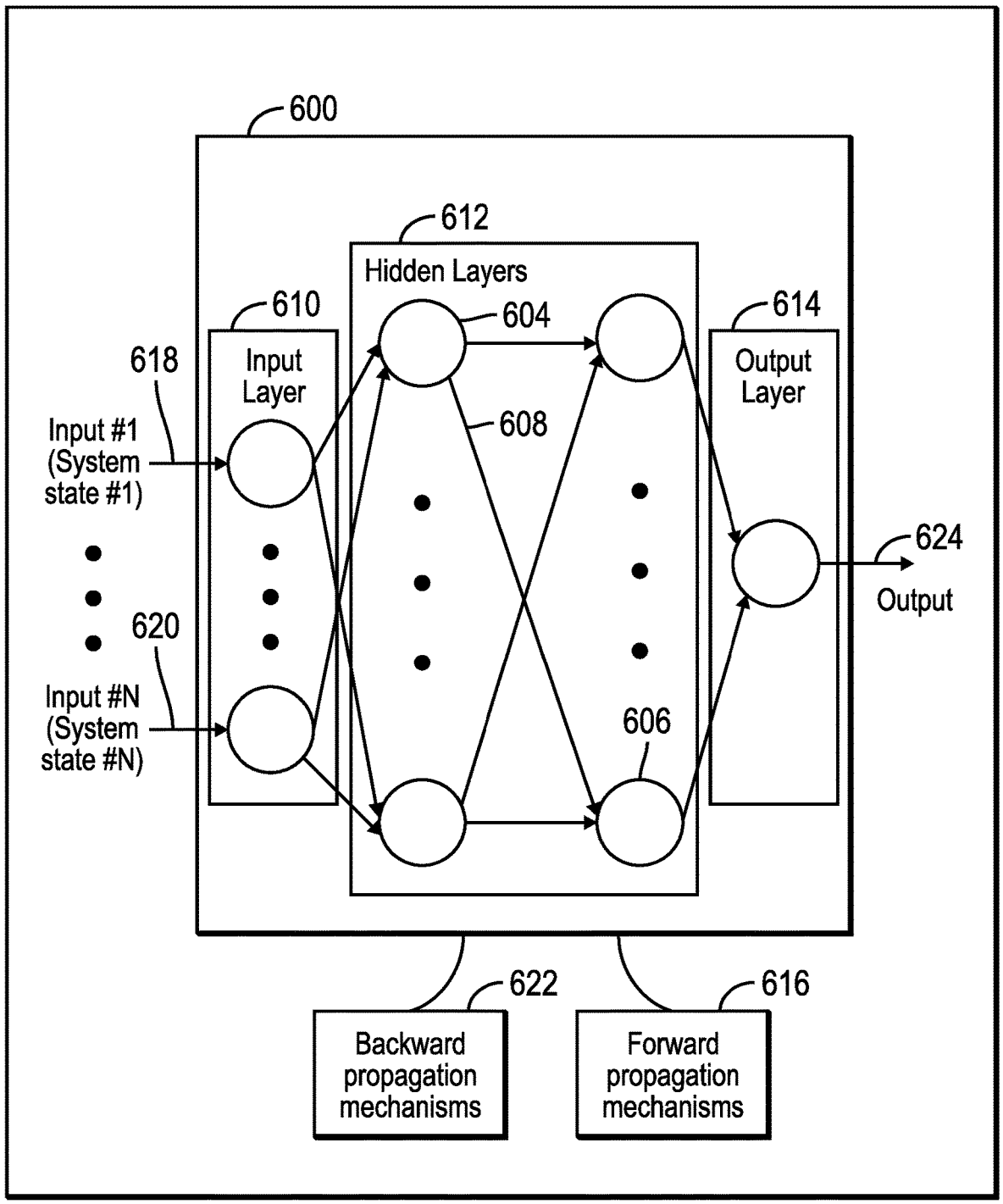
FIG. 6 illustrates, in a block diagram, details of a machine learning model in accordance with certain embodiments.

FIG. 6 illustrates, in a block diagram, details of a machine learning model 600 in accordance with certain embodiments. In certain embodiments, the one or more machine learning models 120, 220 are implemented using the components of the machine learning model 600.

The machine learning model 600 may comprise a neural network with a collection of nodes with links connecting them, where the links are referred to as connections. For example, FIG. 6 shows a node 604 connected by a connection 608 to the node 606. The collection of nodes may be organized into three main parts: an input layer 610, one or more hidden layers 612, and an output layer 614.

In this example, the connection between one node and another is represented by a number called a weight, where the weight may be either positive (if one node excites another) or negative (if one node suppresses or inhibits another). Training the machine learning model 600 entails calibrating the weights in the machine learning model 600 via mechanisms referred to as forward propagation 616 and backward propagation 622. Bias nodes that are not connected to any previous layer may also be maintained in the machine learning model 600. A bias may be described as an extra input of 1 with a weight attached to it for a node.

In forward propagation 616, a set of weights are applied to the input data 618 . . . 620 to calculate the output 624. For the first forward propagation, the set of weights may be selected randomly or set by, for example, a system administrator. That is, in the forward propagation 616, embodiments apply a set of weights to the input data 618 . . . 620 and calculate an output 624.

In backward propagation 622 a measurement may be made for a margin of error of the output 624, and the weights are adjusted to decrease the error. Backward propagation 622 compares the output that the machine learning model 600 produces with the output that the machine learning model 600 was meant to produce, and uses the difference between them to modify the weights of the connections between the nodes of the machine learning model 600, starting from the output layer 614 through the hidden layers 612 to the input layer 610, i.e., going backward in the machine learning model 600. In time, backward propagation 622 causes the machine learning model 600 to learn, reducing the difference between actual and intended output to the point where the two come very close or coincide.

The machine learning model 600 may be trained using backward propagation to adjust weights at nodes in a hidden layer to produce adjusted output values based on the provided inputs 618 . . . 620. A margin of error may be determined with respect to the actual output 624 from the machine learning model 600 and an expected output to train the machine learning model 600 to produce the desired output value based on a calculated expected output. In backward propagation, the margin of error of the output may be measured and the weights at nodes in the hidden layers 612 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 600 may be configured to repeat both forward and backward propagation until the weights of the machine learning model 600 are calibrated to accurately predict an output.

The machine learning model 600 implements a machine learning technique such as decision tree learning, association rule learning, artificial neural network, inductive programming logic, support vector machines, Bayesian models, etc., to determine the output value 624.

In certain machine learning model 600 implementations, weights in a hidden layer of nodes may be assigned to these inputs to indicate their predictive quality in relation to other of the inputs based on training to reach the output value 624.

With embodiments, the machine learning model 600 is a neural network, which may be described as a collection of "neurons" with "synapses" connecting them.

With embodiments, there may be multiple hidden layers 612, with the term "deep" learning implying multiple hidden layers. Hidden layers 612 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 616 and the backward propagation 622.

In backward propagation 622, embodiments measure the margin of error of the output and adjust the weights accordingly to decrease the error.

Neural networks repeat both forward and backward propagation until the weights are calibrated to accurately predict the output 624.

In certain embodiments, the inputs to an instance of the machine learning model 600 are the location of one or more assets and corresponding work orders for problems at the one or more assets, and the outputs of the machine learning model 600 are predicted cost and predicted period of time.

In certain embodiments, the inputs to another instance of the machine learning model 600 are the problems of the assets provided in the events, and the output of the machine learning model 600 is a prioritized list of problems and associated assets.

In certain embodiments, the machine learning model may be refined based on whether the outputted recommendations, once taken, generate positive outcomes.

Figure 7:
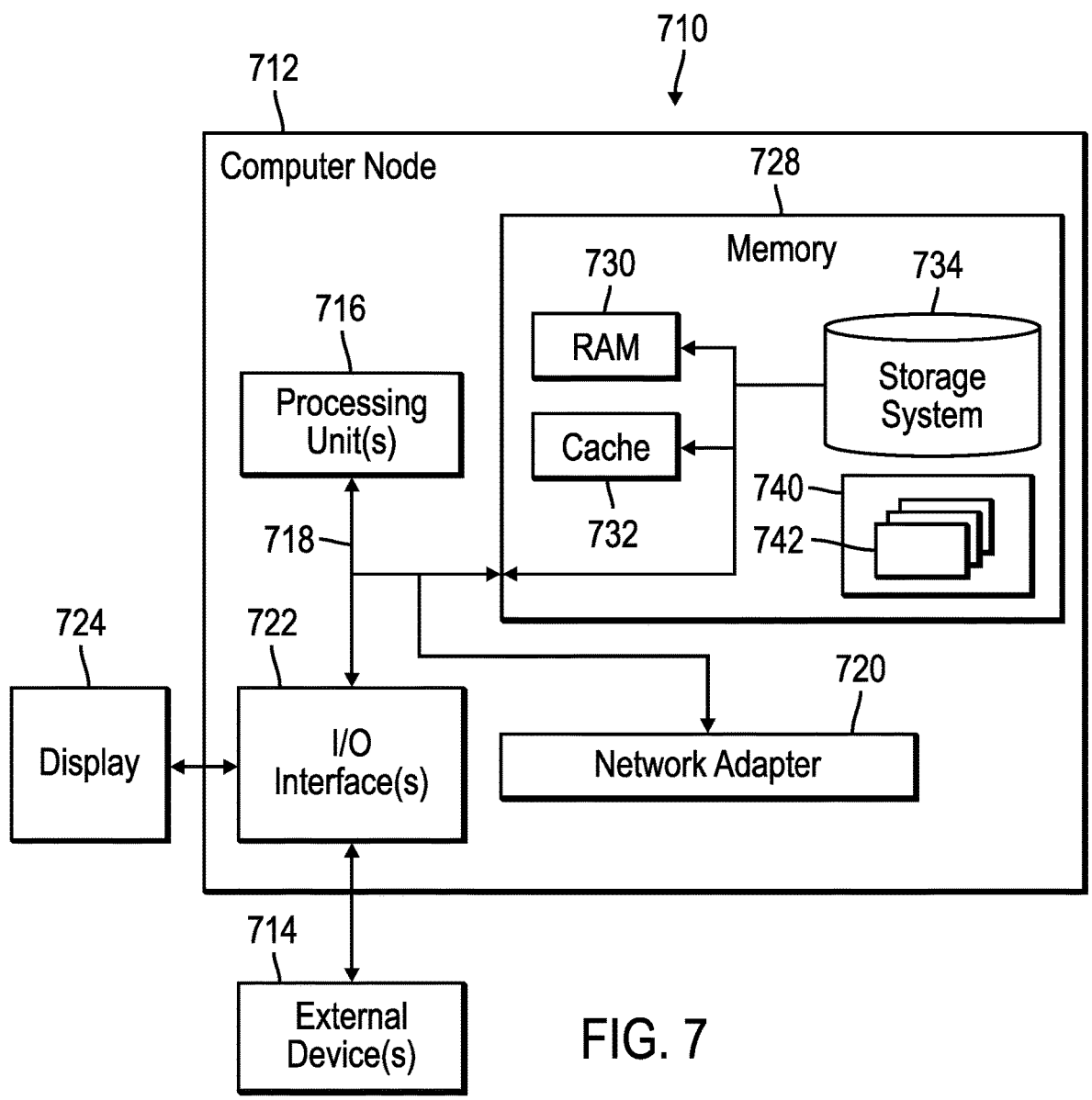
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer node 712. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
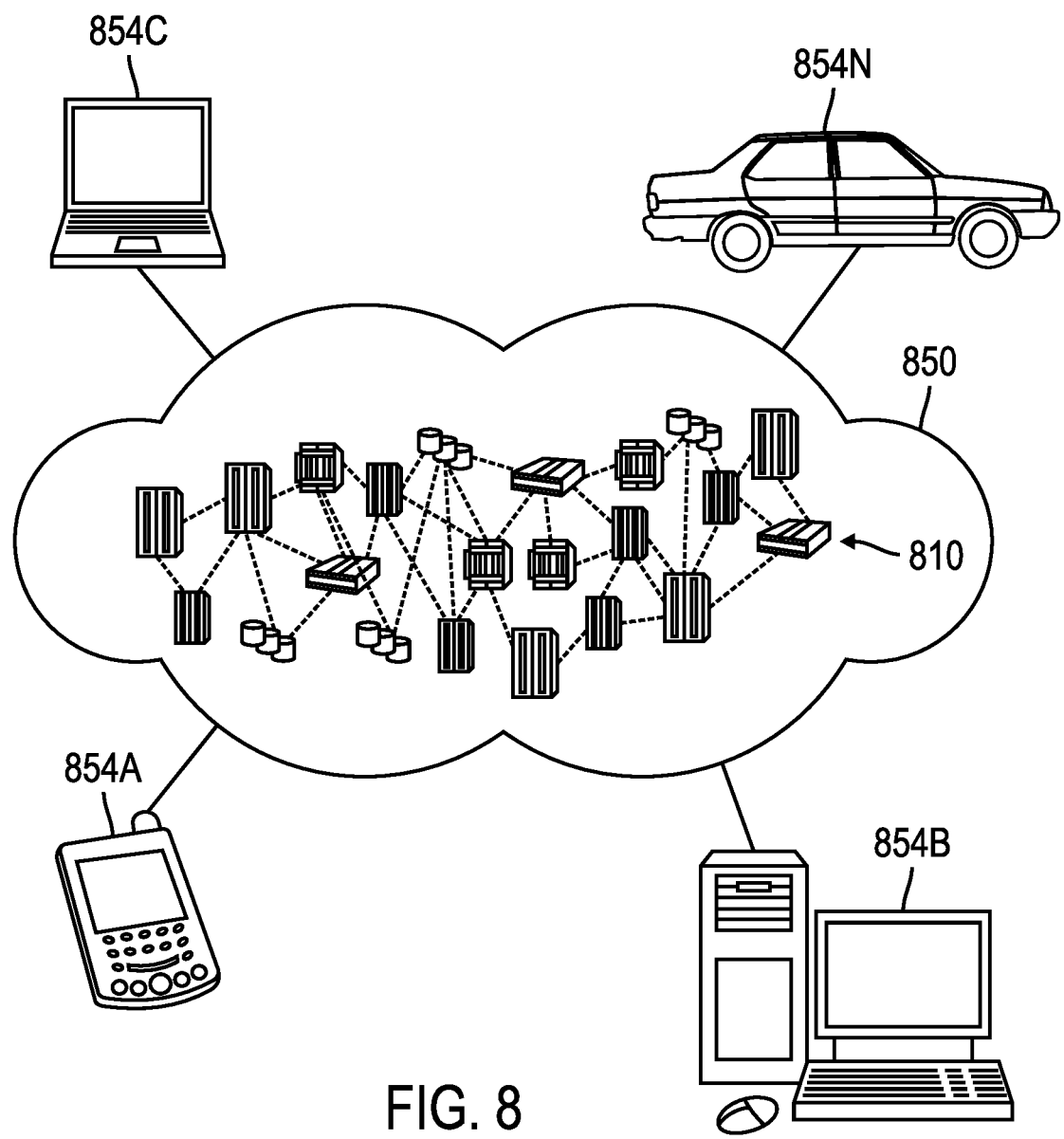
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
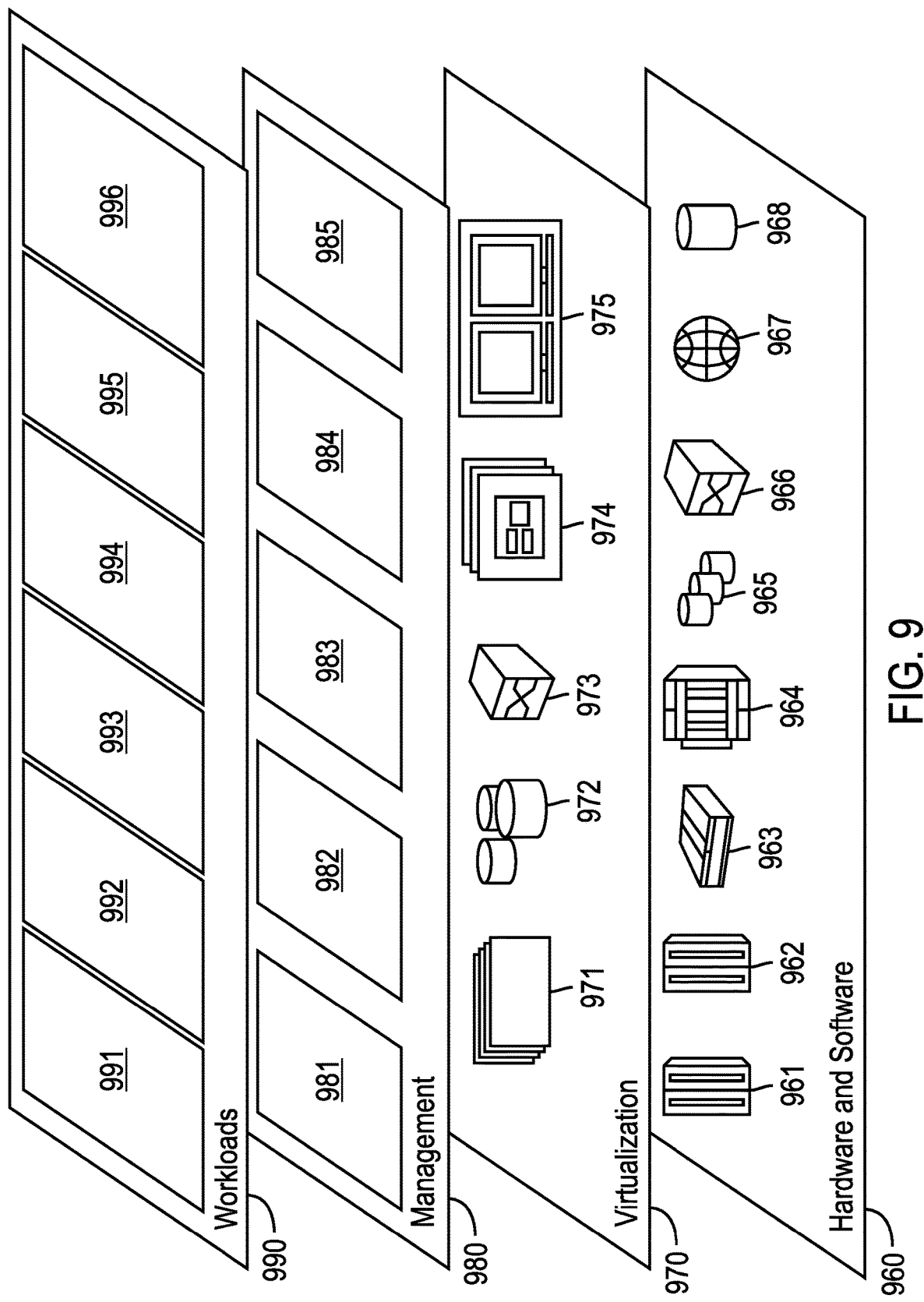
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and drone deployment for distributed asset maintenance and repair 996.

Thus, in certain embodiments, software or a program, implementing drone deployment for distributed asset maintenance and repair in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, d, e, n, p, r, s, t, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   identifying a fix for a problem at an asset of a plurality of assets;
   identifying a drone of a plurality of drones to perform the fix;
   generating an initial flight plan that describes a drone flight path for the drone from a current location to a location of the asset;
   obtaining, from one or more edge devices, real-time data that includes real-time air traffic data, real-time road traffic data, and real-time drone flight path conditions;
   generating an updated flight plan for the drone by updating the drone flight path using the real-time air traffic data, the real-time road traffic data, and the real-time drone flight path conditions;
   predicting, using a machine learning model, a cost and a period of time for the updated drone flight path;
   generating an overall flight plan with a particular drone flight path for the drone and drone flight paths for one or more other drones using the predicted cost and the predicted period of time;
   sending the particular drone flight path from the overall flight plan to the drone with instructions to fix the problem; and
   in response to receiving a status from the drone of the problem being fixed,
      computing an actual cost and an actual period of time for the drone flight path based on the status; and
      updating the machine learning model with the actual cost and the actual period of time.

2. The computer-implemented method of claim 1, further comprising operations for:
   identifying the one or more edge devices near the location of the asset, wherein the one or more edge devices are co-located with drone traffic control towers that provide the real-time air traffic data, and wherein the one or more edge devices are co-located with enhanced traffic lights that provide the real-time road traffic data.

3. The computer-implemented method of claim 1, further comprising operations for:
   identifying a first amount of time to get resources to the location of the asset to fix the problem and a second amount of time to fix the problem once the resources are at the location, wherein the initial flight plan is generated using the first amount of time and the second amount of time.

4. The computer-implemented method of claim 1, further comprising operations for:
   assigning a priority to the fix, wherein the overall flight plan is based on the priority for the fix.

5. The computer-implemented method of claim 1, wherein the fix comprises updating one or more software modules at the asset.

6. The computer-implemented method of claim 1, wherein a Software as a Service (SaaS) is configured to perform the operations of the computer-implemented method.

7. A computer program product, the computer program product comprising a computer readable storage medium having program code embodied therewith, the program code executable by at least one processor to perform operations for:
   identifying a fix for a problem at an asset of a plurality of assets;
   identifying a drone of a plurality of drones to perform the fix;
   generating an initial flight plan that describes a drone flight path for the drone from a current location to a location of the asset;
   obtaining, from one or more edge devices, real-time data that includes real-time air traffic data, real-time road traffic data, and real-time drone flight path conditions;
   generating an updated flight plan for the drone by updating the drone flight path using the real-time air traffic data, the real-time road traffic data, and the real-time drone flight path conditions;
   predicting, using a machine learning model, a cost and a period of time for the updated drone flight path;
   generating an overall flight plan with a particular drone flight path for the drone and drone flight paths for one or more other drones using the predicted cost and the predicted period of time;
   sending the particular drone flight path from the overall flight plan to the drone with instructions to fix the problem; and
   in response to receiving a status from the drone of the problem being fixed,
      computing an actual cost and an actual period of time for the drone flight path based on the status; and
      updating the machine learning model with the actual cost and the actual period of time.

8. The computer program product of claim 7, wherein the program code is executable by the at least one processor to further perform operations for:
   identifying the one or more edge devices near the location of the asset, wherein the one or more edge devices are co-located with drone traffic control towers that provide the real-time air traffic data, and wherein the one or more edge devices are co-located with enhanced traffic lights that provide the real-time road traffic data.

9. The computer program product of claim 7, wherein the program code is executable by the at least one processor to further perform operations for:
   identifying a first amount of time to get resources to the location of the asset to fix the problem and a second amount of time to fix the problem once the resources are at the location, wherein the initial flight plan is generated using the first amount of time and the second amount of time.

10. The computer program product of claim 7, wherein the program code is executable by the at least one processor to further perform operations for:
assigning a priority to the fix, wherein the overall flight plan is based on the priority for the fix.

11. The computer program product of claim 7, wherein the fix comprises updating one or more software modules at the asset.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
identifying a fix for a problem at an asset of a plurality of assets;
identifying a drone of a plurality of drones to perform the fix;
generating an initial flight plan that describes a drone flight path for the drone from a current location to a location of the asset;
obtaining, from one or more edge devices, real-time data that includes real-time air traffic data, real-time road traffic data, and real-time drone flight path conditions;
generating an updated flight plan for the drone by updating the drone flight path using the real-time air traffic data, the real-time road traffic data, and the real-time drone flight path conditions;
predicting, using a machine learning model, a cost and a period of time for the updated drone flight path;
generating an overall flight plan with a particular drone flight path for the drone and drone flight paths for one or more other drones using the predicted cost and the predicted period of time;
sending the particular drone flight path from the overall flight plan to the drone with instructions to fix the problem; and
in response to receiving a status from the drone of the problem being fixed,
computing an actual cost and an actual period of time for the drone flight path based on the status; and
updating the machine learning model with the actual cost and the actual period of time.

14. The computer system of claim 13, further performing operations comprising:
identifying the one or more edge devices near the location of the asset, wherein the one or more edge devices are co-located with drone traffic control towers that provide the real-time air traffic data, and wherein the one or more edge devices are co-located with enhanced traffic lights that provide the real-time road traffic data.

15. The computer system of claim 13, further performing operations comprising:
identifying a first amount of time to get resources to the location of the asset to fix the problem and a second amount of time to fix the problem once the resources are at the location, wherein the initial flight plan is generated using the first amount of time and the second amount of time.

16. The computer system of claim 13, further performing operations comprising:
assigning a priority to the fix, wherein the overall flight plan is based on the priority for the fix.

17. The computer system of claim 13, wherein a Software as a Service (SaaS) is configured to perform the operations of the computer system.

18. The computer system of claim 13, wherein the fix comprises updating one or more software modules at the asset.

* * * * *